(12) United States Patent
Beech et al.

(10) Patent No.: US 10,262,258 B2
(45) Date of Patent: Apr. 16, 2019

(54) CARD PRINTING MECHANISM WITH CARD RETURN PATH

(71) Applicant: Entrust Datacard Corporation, Shakopee, MN (US)

(72) Inventors: Brian Beech, Shakopee, MN (US); Thomas J. Wagener, Shakopee, MN (US); Timothy J. Flitsch, Shakopee, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 0 days.

(21) Appl. No.: 15/958,842

(22) Filed: Apr. 20, 2018

(65) Prior Publication Data

US 2018/0240007 A1 Aug. 23, 2018

Related U.S. Application Data

(63) Continuation of application No. 15/395,309, filed on Dec. 30, 2016, now Pat. No. 10,049,320.

(Continued)

(51) Int. Cl.
*B41J 3/407* (2006.01)
*G06K 19/10* (2006.01)
(Continued)

(52) U.S. Cl.
CPC ............ *G06K 19/10* (2013.01); *B41J 3/4073* (2013.01); *B41J 3/60* (2013.01); *B41J 13/12* (2013.01); *G06K 13/07* (2013.01); *G06K 13/077* (2013.01)

(58) Field of Classification Search
CPC ..... B41J 13/12; B41J 3/60; B65H 2701/1914; B65H 2301/33214; G06K 17/00; G06K 2017/0041; G07F 7/1008; B42D 25/00
See application file for complete search history.

(56) References Cited

U.S. PATENT DOCUMENTS 4,772,782 A 9/1988 Nonat
4,825,054 A 4/1989 Rust et al.
(Continued)

FOREIGN PATENT DOCUMENTS

DE 3704059 A1 8/1988
EP 1246449 A2 10/2002
(Continued)

OTHER PUBLICATIONS

International Search Report and Written Opinion of international application No. PCT/US2016/069401, dated Apr. 14, 2017, total 11 pages.

(Continued)

*Primary Examiner* — John Zimmermann
(74) *Attorney, Agent, or Firm* — Hamre, Schumann, Mueller & Larson, P.C.

(57) ABSTRACT

Card processing mechanisms and methods whereby after a card has been processed on one surface thereof at a card processing station such as, but not limited to, a card printing mechanism, the card can be recirculated back upstream of the card processing station along a return card travel path that is separate from the primary card travel path through the card processing station where the card can then be reintroduced back into the primary card travel path and transported through the card processing station a second time. As the card is being returned along the return card travel path, the card can be flipped over so that when the card is transported back through the card processing station, the opposite surface of the card can be processed.

18 Claims, 4 Drawing Sheets

Related U.S. Application Data

(60) Provisional application No. 62/276,375, filed on Jan. 8, 2016.

(51) Int. Cl.
  *B41J 3/60* (2006.01)
  *B41J 13/12* (2006.01)
  *G06K 13/07* (2006.01)
  *G06K 13/077* (2006.01)

(56) References Cited

U.S. PATENT DOCUMENTS

| | | |
|---|---|---|
| 5,129,641 A | 7/1992 | Long |
| 5,266,781 A | 11/1993 | Warwick et al. |
| 5,337,134 A | 8/1994 | Sato et al. |
| 5,941,522 A * | 8/1999 | Hagstrom ............... B41J 13/12 271/225 |
| 5,943,238 A | 8/1999 | Nioche et al. |
| 6,082,617 A | 7/2000 | Meyer-Wittreck et al. |
| 6,105,493 A | 8/2000 | Skubic et al. |
| 6,308,886 B1 | 10/2001 | Benson et al. |
| 6,695,205 B1 | 2/2004 | Lundstrom et al. |
| 6,783,067 B2 | 8/2004 | Kreuter et al. |
| 6,902,107 B2 | 6/2005 | Shay et al. |
| 7,398,972 B2 | 7/2008 | Schuller et al. |
| 7,434,728 B2 | 10/2008 | Paulson et al. |
| 8,721,205 B2 | 5/2014 | Francis et al. |
| 9,434,562 B2 * | 9/2016 | Carlson ................ B65H 3/0816 |
| 2002/0036374 A1 | 3/2002 | Yui |
| 2002/0036376 A1 | 3/2002 | Yui |
| 2003/0151248 A1 * | 8/2003 | Kubert ............. G06K 19/06046 283/100 |
| 2003/0197770 A1 * | 10/2003 | Klinefelter ............. B41J 13/103 347/104 |
| 2005/0053406 A1 | 3/2005 | Jones |
| 2005/0082738 A1 | 4/2005 | Bryant et al. |
| 2005/0140769 A1 | 6/2005 | Kanemaru et al. |
| 2011/0243634 A1 | 10/2011 | Kagami et al. |
| 2012/0286464 A1 | 11/2012 | Takei et al. |
| 2013/0220984 A1 | 8/2013 | Cronin et al. |

FOREIGN PATENT DOCUMENTS

| | | |
|---|---|---|
| JP | S58167347 A | 10/1983 |
| JP | 2011131952 | 7/2011 |
| WO | 0122356 A3 | 3/2001 |
| WO | 0235911 | 5/2002 |

OTHER PUBLICATIONS

"Persomaster: EMV Banking Card Personalization System First with DoD Inkjet Technology", Brochure, Atlantic Zeiser, Date: Exact date unknown; obtained from http://www.atlanticzeiser.com/business-segments/card-systems/products/ by the Applicant in Jan. 2018; 6 pages.

The extended European search report issued in European patent application No. 16884229.2 dated Nov. 15, 2018; 8 pages.

* cited by examiner

CARD PRINTING MECHANISM WITH CARD RETURN PATH

FIELD

This disclosure relates to card processing systems that personalize or otherwise process plastic cards such as financial cards including credit and debit cards, identification cards, driver's licenses, gift cards, and other plastic cards.

BACKGROUND

Plastic cards such as financial cards including credit and debit cards, identification cards, driver's licenses, gift cards, and other plastic cards may be personalized with personal information of the intended card holder. Examples of personalization include, but are not limited to, names, addresses, photographs, account numbers, employee numbers, or the like. The personal information may be applied to the card in a number of different ways including, but not limited to, printing on a surface of the document, storing the information on a magnetic stripe disposed on the card, and storing the information on an integrated circuit chip or smart chip embedded in the card.

Card processing systems that personalize plastic cards are utilized by institutions that issue such personalized plastic cards. In some cases, card processing systems can be designed for relatively small scale, individual card personalization in relatively small volumes, for example measured in tens or low hundreds per hour. In these mechanisms, a single document to be personalized is input into a card processing system, which typically includes one or two processing capabilities, such as printing and laminating. These processing machines are often termed desktop processing machines because they have a relatively small footprint intended to permit the processing machine to reside on a desktop. Many examples of desktop processing machines are known, such as the SD or CD family of desktop card printers available from Entrust Datacard Corporation of Shakopee, Minn. Other examples of desktop processing machines are disclosed in U.S. Pat. Nos. 7,434,728 and 7,398,972, each of which is incorporated herein by reference in its entirety.

For large volume batch production of personalized cards (for example, on the order of high hundreds or thousands per hour), institutions often utilize card processing systems that employ multiple processing stations or modules to process multiple cards at the same time to reduce the overall per card processing time. Examples of such machines include the MX and MPR family of central issuance processing machines available from Entrust Datacard Corporation of Shakopee, Minn. Other examples of central issuance processing machines are disclosed in U.S. Pat. Nos. 4,825,054, 5,266,781, 6,783,067, and 6,902,107, all of which are incorporated herein by reference in their entirety.

SUMMARY

Card processing mechanisms, systems and methods are described whereby after a card has been processed on one surface thereof at a card processing station such as, but not limited to, a card printing mechanism, the card can be recirculated back upstream of the card processing station along a return card travel path that is separate from the primary card travel path through the card processing station where the card can then be reintroduced back into the primary card travel path and transported through the card processing station a second time. As the card is being returned along the return card travel path, the card can be flipped over so that when the card is transported back through the card processing station, the opposite surface of the card can be processed.

Processing as used herein is intended to encompass any processing operation on a card surface including, but not limited to, printing, laminating, indenting, embossing, and other processing operations. In one embodiment, the card processing station is configured to perform a printing operation. Printing can include drop-on-demand printing with an ultra-violet (UV) curable ink, printing using a thermal dye transfer ribbon, laser marking using a laser, retransfer printing, and other card printing techniques.

In some embodiments, improved card processing systems include a card printing mechanism having a primary card path and a separate return card path. The return card path allows a card that has been fed through a print station to be returned back to the primary card path at a portion upstream of the print station so that the card can be fed again through the print station. One or more card reorienting mechanisms (e.g., flippers) can be located on the return card path to orient the card into a desired position for the second pass through the print station. In some embodiments, the card reorienting mechanism positions the card so that the same surface of the card that was processed during the first pass through the print station can be processed during the second pass through the print station. In other embodiments, the card reorienting mechanism can position the card so that the opposite side of the card can be processed during the second pass through the print station. The card return path can have any general shape as long as it functions to efficiently return cards to the print station for a second pass through the print station. In some embodiments, the return card path can be on substantially the same plane as the primary card path. Alternatively, the return card path can be located on a plane that is above or below the plane of the primary card path. In systems that employ a module or component upstream and/or downstream of the card printing mechanism that has a lower maximum card processing rate, the use of a return card path allows the card printing mechanism to process cards at a higher rate and can eliminate the need for a second card printing mechanism, which reduces the cost and footprint of the system.

In one embodiment, a method of processing cards in a card processing system that includes a card printing mechanism with a print station includes printing on a first side of a first card in the card processing system using the print station of the card printing mechanism. After printing on the first side of the first card, a second side of a second card within the card processing system is printed on using the print station, where the second card includes printing on a first side thereof that was previously applied to the first side thereof using the print station. In addition, after printing on the second side of the second card, printing on a second side of the first card is performed using the print station. In another embodiment, after printing on the first side of the first card and before printing on the second side of the first card, a first side or a second side of a plurality of cards in addition to the second card can be printed on using the print station.

In one embodiment, the card processing station with the return card travel path can process cards at a card rate that is higher, for example up to twice as high, than a card processing rate of card processing stations immediately upstream and/or downstream of the card processing station.

In another embodiment, the card processing system can be configured such that a card can travel through the card processing system in a first orientation, for example vertical relative to the ground. However, upon reaching a card processing station, for example the card processing station with the return card travel path, the card can be rotated 90 degrees to a second orientation, for example horizontal relative to the ground, for processing within the card processing station. After processing in the card processing station is finished, the card can be rotated back to the first orientation if necessary for further processing downstream of the card processing station.

The card processing mechanisms and methods described herein can be used in large volume, batch production or central issuance card processing systems as well as lower volume, desktop card processing systems.

DRAWINGS

FIG. 1 schematically illustrates an embodiment of a card processing system that can utilize the card printing mechanism described herein.

DETAILED DESCRIPTION

Figure 1:
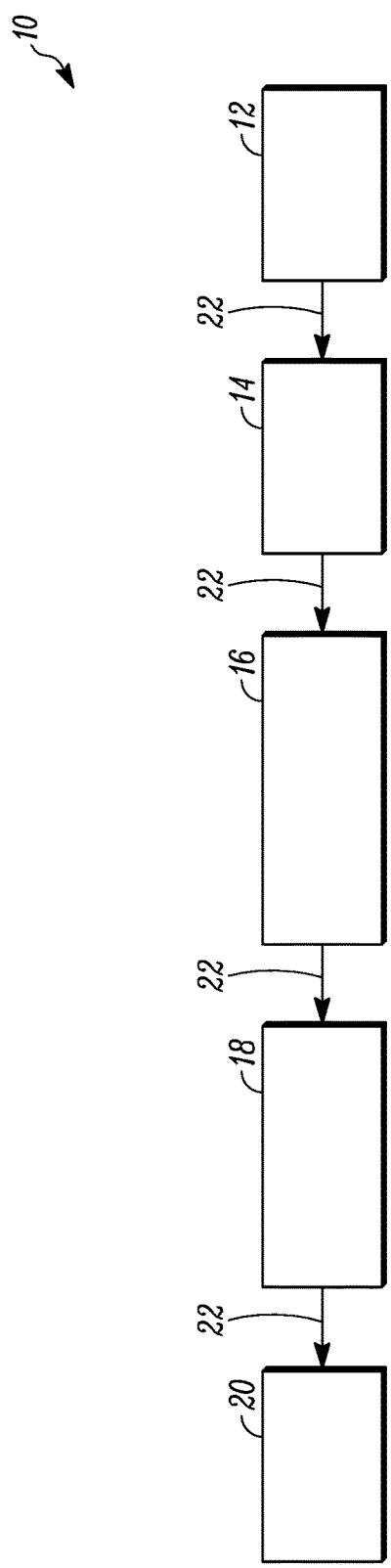

FIG. 1 illustrates an embodiment of a card processing system 10 that is configured to personalize and otherwise process plastic cards such as financial cards including credit and debit cards, identification cards, driver's licenses, gift cards, and other plastic cards. The personal information may also be referred to as variable data since the data varies from card to card. Examples of personal information include, but not are limited to, names, addresses, photographs, account numbers, employee numbers, or the like. Non-personal, or non-variable, data such as corporate logos, printed backgrounds, and the like may also be applied to the cards. The personal and non-personal information may be applied to a card in the system 10 in a number of different ways including, but not limited to, printing on a surface of the card, storing the information on a magnetic stripe disposed on the card, and storing the information on an integrated circuit chip or smart chip embedded in the card.

In the example illustrated in FIG. 1, the system 10 can include a card feed mechanism 12, a card processing mechanism 14, a card printing mechanism 16 that can also be referred to as a card processing mechanism, another card processing mechanism 18, and a card output 20 into which processed cards are output. The card processing system 10 illustrated in FIG. 1 is a large volume, batch production or central issuance card processing system. However, the card printing mechanism 16 described herein can be used in other card processing systems including in lower volume, desktop card processing systems.

The mechanisms 14, 16, 18 can be arranged in any order in the system 10. In addition, not all of the mechanisms 14, 16, 18 need to be utilized. For example, in one embodiment, the mechanism 16 can be used by itself without the other mechanisms 14, 18. In addition, additional card processing mechanisms can be utilized with the mechanisms 14, 16, 18.

The card feed mechanism 12 feeds cards to be processed by the system 10 onto a card processing path 22 at up to a first card rate. The card rate of the feed mechanism 12 refers to how fast the mechanism 12 can feed cards one by one into the processing path 22. In one embodiment, the first card rate can be up to about 3000 cards per hour. The card feed mechanism 12 can include one or more card hoppers containing cards waiting to be fed one-by-one onto the card processing path 22.

The card processing mechanism 16 is disposed on and along the card processing path 22 to receive cards. The card processing mechanism 16 is configured to perform a processing operation on each card. In one embodiment, the card processing mechanism 16 is configured to perform printing. Examples of printing include drop-on-demand printing with a UV curable ink, printing using a thermal dye transfer ribbon, retransfer printing, laser marking using a laser, and other card printing techniques.

As discussed in further detail below with respect to FIGS. 2-4, when the card processing mechanism 16 is configured to perform printing, the processing mechanism 16 can be referred to as a card printing mechanism that has a primary card travel path 24 that is collinear with the card processing path 22, at least one print station 26 on the primary card travel path 24 that performs a printing operation on a surface of a card on the primary card travel path 24, and a return card travel path 28 that returns a card to a location on the primary card travel path 24 that is upstream of the at least one print station 26 after the card has been printed on by the at least one print station 26. When configured as a card printing mechanism, the card processing mechanism 16 can process cards at up to a card rate that is greater than the first card rate. For example, the mechanism 16 can have a second card rate of up to about 6000 cards per hour or more. The card rate of the card processing mechanism 16 refers to how fast (i.e. the rate) the card processing mechanism 16 can perform its intended processing operation(s) on the cards.

Returning to FIG. 1, in the illustrated example, the card processing mechanism 14 is disposed on and along the card processing path 22 downstream of the card feed mechanism 12. The card processing mechanism 14 is configured to perform one or more processing operations on each card at up to the first card rate, for example up to about 3000 cards per hour. The card rate of the card processing mechanism 14 refers to how fast (i.e. the rate) the card processing mechanism 14 can perform its intended processing operation(s) on the cards. The card processing mechanism 14 can be a smart card programming mechanism that is configured to, for example, program a chip embedded in each card. The smart card programming mechanism can be configured to program one card at a time. Alternatively, the smart card programming mechanism can be configured to simultaneously program multiple cards. Example of a smart card programming mechanisms that simultaneously program multiple cards that could be utilized are described in U.S. Pat. No. 6,695,205 (disclosing an elevator-type smart card programming mechanism) and U.S. Pat. No. 5,943,238 (disclosing a barrel-type smart card programming mechanism), the entire contents of each patent are incorporated herein by reference. The card processing mechanism 14 may alternatively be configured to program a magnetic stripe on each card, or the card processing mechanism 14 can perform both smart card programming and magnetic stripe programming. In another embodiment, a separate magnetic stripe programming mechanism (not illustrated) can be located between the card processing mechanism 14 and the card feed mechanism 12 or between the card processing mechanism 14 and the card processing mechanism 16. In addition, the card processing mechanism 14 can be located at other positions in the system 10 or is not used, in which case the card processing mechanism 14 is not between the card processing mechanism 16 and the card feed mechanism 12. The card processing mechanism 14, for example when configured as a smart card programming mechanism, can also be located downstream of the card processing mechanism 16.

In the embodiment illustrated in FIG. 1, the card processing mechanism 16 is shown as being downstream of the card processing mechanism 14. In another embodiment, the card processing mechanism 16 can be the first processing mechanism downstream from the card feed mechanism 12 in which case the card processing mechanism 16 is not downstream of the card processing mechanism 14. The card processing mechanism 16 is configured to perform a processing operation on each card that is different than the card processing operation performed by the card processing mechanism 14.

The embodiment illustrated in FIG. 1 also shows the card processing mechanism 18 as being disposed along the card processing path 22 downstream of the card processing mechanism 16. However, other locations of the card processing mechanism 18 in the system 10 are possible. The card processing mechanism 18 is configured to perform a processing operation on each card that is different than the card processing operations performed by the card processing mechanism 14 and by the card processing mechanism 16. For example, the card processing mechanism 18 can be configured to perform laser marking on each card using a laser, and/or apply a hologram overlay onto each card, and/or perform other card processing operations. In one embodiment, the card processing mechanism 18 can have a card processing rate that is approximately equal to the first card rate. The card rate of the card processing mechanism 18 refers to how fast (i.e. the rate) the card processing mechanism 18 can perform its intended processing operation(s) on the cards.

Cards that have been processed are collected in the card output 20 that is disposed along the card processing path 22 downstream of the card processing mechanism 16. The processed cards can then be distributed to their intended recipients, for example by attaching the cards to mailer forms and mailing to the intended recipients.

Many other card processing mechanisms can be used in addition to, or in place of, the processing mechanisms illustrated in FIG. 1. For example, an indent mechanism that performs indenting on each card can be provided upstream of or downstream of the card processing mechanism 16. A quality assurance mechanism that checks the quality of the processed cards can be located between the card output 20 and the card processing mechanism 18. Many other processing mechanisms, and combinations of processing mechanisms, can be utilized.

Figure 2:
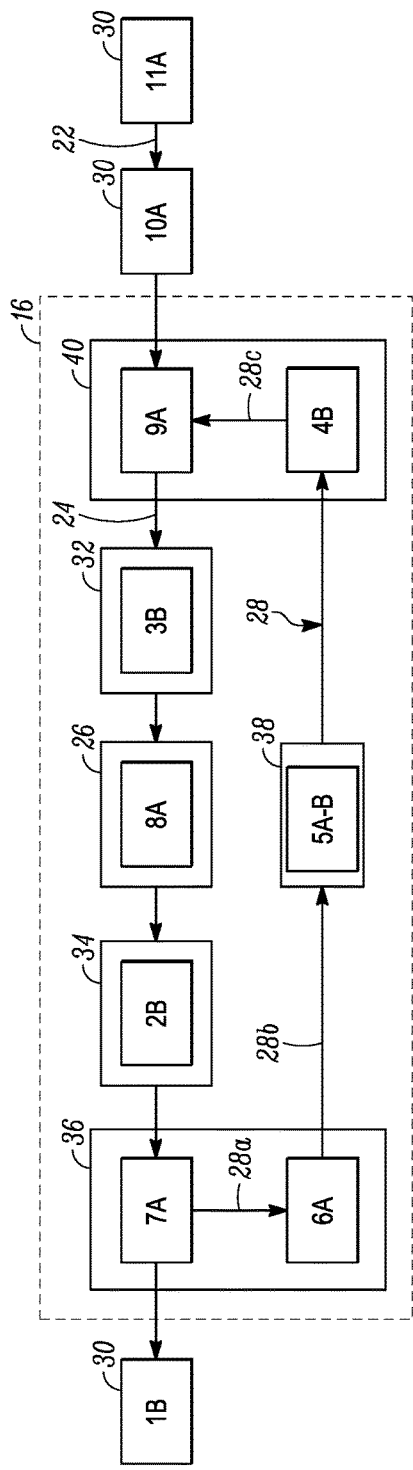
FIG. 2 illustrates an example of a sequence of cards progressing through the card printing mechanism described herein.
Figure 3:
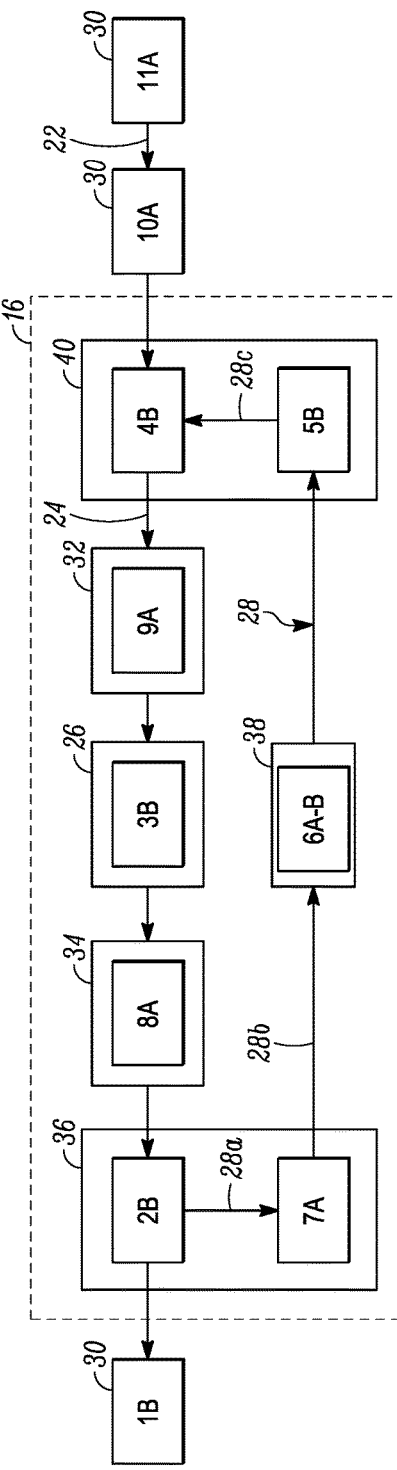
FIG. 3 illustrates a sequence similar to FIG. 2 but with the cards advanced one position.
Figure 4:
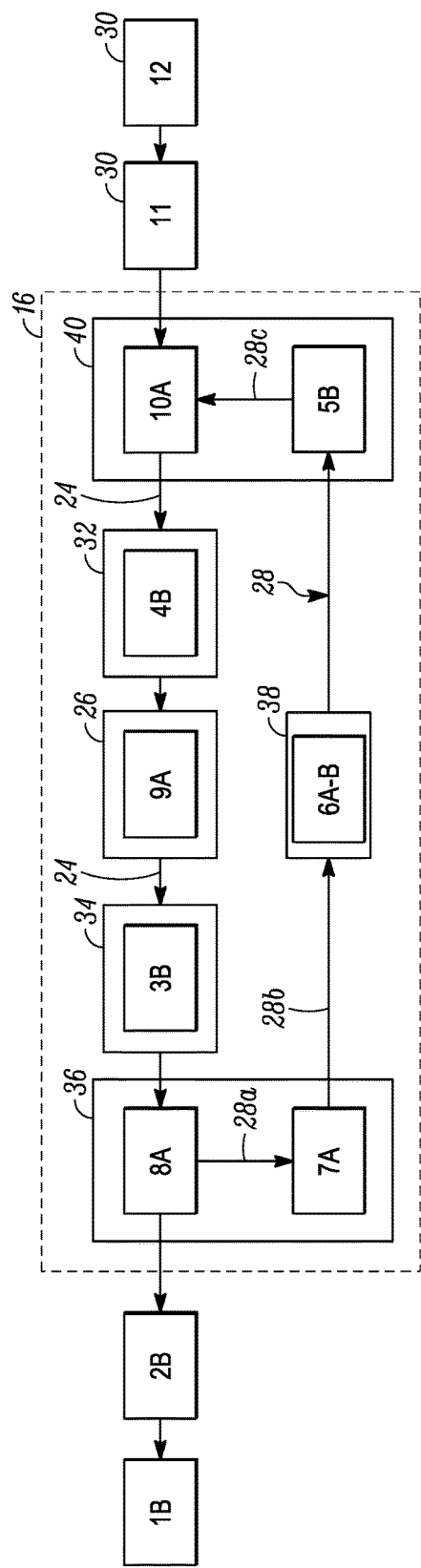
FIG. 4 illustrates a sequence similar to FIG. 3 but with the cards advanced another position.

Referring now to FIGS. 2-4, for sake of convenience, the card processing mechanism 16 will be described as a card printing mechanism that is configured to perform printing, in particular drop-on-demand printing with a UV curable ink. Suitable drop-on-demand printing mechanisms that could be utilized are sold under the tradename PERSOMASTER by Atlantic Zeiser GmbH of Emmingen, Germany. FIGS. 2-4 illustrate a number of different cards 30 at different locations upstream of, downstream of, and within the mechanism 16. Each card 30 is numbered to help described an example sequencing of cards. In addition, the letter "A" on a card 30 indicates one side of the card 30, while the letter "B" indicates the opposite side of the card 30.

The mechanism 16 includes the at least one print station 26 on the primary card travel path 24 that performs a printing operation on surface A or B of each card 30 on the primary card travel path 24. The print station 26 can include a plurality of print heads 27 (shown in FIG. 5), some of which print a different color. Optionally, at least one of the print heads 27 can apply a spray coating onto the card surface A or B. In the case of drop-on-demand printing with a UV curable ink, an optional surface treatment station 32 can be located on the primary card travel path 24 upstream of the print station 26. The optional surface treatment station 32, if used, is configured to treat the surface A or B of each card 30 in order to lower the surface tension of the card surface so that the UV ink stays in place better when applied to the card surface. In addition, a UV curing station 34 can be located on the primary card travel path 24 downstream of the print station 26. The UV curing station 34 is configured to apply UV light to the card surface in order to cure the applied UV ink.

The return card travel path 28 intersects the primary card travel path 24 both downstream of and upstream of the print station 26. The return card travel path 28 is configured to divert or recirculate a card that has been fed through the print station 26 from the primary card travel path 24 and return the card back to the primary card travel path 24 at a location upstream of the print station 26 so that the card can again be fed through the print station 26. In addition, in some embodiments, as the card is being recirculated along the return card travel path 28, the card can be flipped 180 degrees so that the surface A or B that was previously printed on is now facing downward and the non-printed surface A or B is facing upward ready to be printed on.

The return card travel path 28 can have any configuration and location that is suitable for recirculating the cards upstream of the print station 26 so they can fed through the print station 26 a second time, or even more than two times. The card return travel path 28 can have any general shape as long as it functions to efficiently return cards to the primary card travel path 24 upstream of the print station for a second pass through the print station 26. In some embodiments, the return card travel path 28 can be on substantially the same plane as the primary card path 24. Alternatively, the return card travel path 28 can be located on a plane that is above or below the plane of the primary card travel path 24. In addition, the return card travel path 28 can be substantially linear or it can be curved. In addition, any mechanism(s) for selectively recirculating the cards along the return card travel path 28 and optionally flipping the cards 180 degrees can be used.

For example, in the embodiment illustrated in FIGS. 2-4, the card travel path 28 can include a first portion 28a that is substantially perpendicular to the primary card travel path 24, a horizontal portion 28b that is substantially parallel to the primary card travel path 24, and a second portion 28c that is substantially perpendicular to the primary card travel path 24. The mechanism 16 can include a first mechanism 36 that can transport a card along the first portion 28a between the primary card travel path 24 and the horizontal portion 28b so as to bring a card from the travel path 24 to the horizontal portion 28b of the travel path 28. A card flipper 38 can be provided along the horizontal portion 28b of the travel path 28 which flips a card 180 degrees. This is evident from FIGS. 2-3 where card (6) is about to enter the card flipper 38 with side A facing up in FIG. 2, and in FIG. 3 card (6) enters the card flipper 38 which flips the card (6) so that its side B is now facing up. A second mechanism 40 is also provided that can transport a card along the second portion 28c between the primary card travel path 24 and the horizontal portion 28b of the return card travel path 28 so as to bring a card from the horizontal portion 28b to the travel path 24.

The mechanisms 36, 40 can have any configuration that can suitably transport the cards between the primary card travel path 24 and the portion 28a of the return card travel path 28. For example, as discussed further below in FIG. 5, the mechanisms 36, 40 can be rotation mechanisms that rotate each card from the primary card travel path 24 to the portion 28a of the return card travel path 28 (in the case of the mechanism 36), and from the portion 28a of the return card travel path 28 back to the primary card travel path 24 (in the case of the mechanism 40).

In other embodiments, the mechanisms 36, 40 can be elevator mechanisms that transport the cards between the card travel paths. An example of a card elevator mechanism is disclosed in U.S. Pat. No. 6,105,493 the entire contents of which are incorporated herein by reference. In other embodiments, a sequence of card flippers can be used to transport cards between the card travel paths. Examples of card flippers are disclosed in U.S. Published Application No. 2013/0220984 and U.S. Pat. No. 7,398,972 the entire contents of each are incorporated herein by reference.

Referring to FIG. 2, a sequence of cards 30 as they progress through the mechanism 16 is illustrated at an arbitrary moment in time. This example will described as using the optional surface treatment station 32. If the surface treatment station 32 is not used, a similar card sequencing can occur but with one less card within the mechanism 16. Card (1) is shown as output from the mechanism 16 with side B facing upward. Card (7) is shown in position at the mechanism 36 with side A facing up ready to be transported to the portion 28b of the card travel path 28. Card (6) is shown after having been transported to the portion 28b of the travel path 28, with side A facing up and ready to enter the flipper 38. Card (5) is shown in the flipper 38 and being flipped from side A to side B so that side B is now facing up. Card (4) is shown with card side B facing up and ready to be brought by the mechanism 40 back to the primary card travel path 24. Card (9) is shown with card side A facing up and having just entered the mechanism 16. Card (3) is shown in the surface treatment station 32 with card side B facing up after having been recirculated back to the travel path 24 so that side B can be treated prior to printing. Card (8) is shown in the print station 26 with side A facing upward for printing on side A by the print station 26. Card (2) is shown in the UV curing station 34 with side B facing up after having been printed on, with the UV curable ink being UV cured in the station 34. Card (10) is shown with side A facing upward and ready to enter the mechanism 16. Card (11) is shown with side A facing upward and ready to take the position of card (10) once card (10) enters the mechanism 16.

FIG. 3 shows the cards of FIG. 2 advanced one step in an example of one possible sequencing of the cards in FIG. 2. Card (1) has not advanced and is shown in the same position output from the mechanism 16 with side B facing upward. Card (7) with side A facing upward has been transported by the mechanism 36 to the portion 28b of the card travel path 28. Card (6) has been advanced along the card travel path portion 28b into the flipper 38 and flipped from side A to side B so that side B now faces upward. Card (5) with side B facing upward has been advanced from the flipper 38 into the mechanism 40 ready to be transported back to the primary card travel path 24. Card (4) with side B facing upward has been transported by the mechanism 40 back to the primary card travel path 24. Card (9) with side A facing upward has been advanced into the surface treatment station 32 so that side A can be treated prior to printing. Card (3) with side B facing upward has been advanced into the print station 26 for printing on side B. Card (8) with side A facing upward has been advanced into the UV curing station 34 after having been printed on, with the UV curable ink being UV cured in the station 34. Card (2) with side B facing upward has been advanced to the elevator mechanism 36 and the position formerly occupied by card (7).

FIG. 4 shows the cards of FIG. 3 advanced another step in an example of one possible sequencing of the cards from FIG. 3. In this example, card (1) is advanced and card (2) is advanced from the mechanism 16 into the position formerly occupied by card (1). Cards (7), (6) and (5) remain in position. Card (8) is advanced from the UV curing station 34 into the position formerly occupied by card (2). Card (3) is advanced into the UV curing station 34. Card (9) is advanced into the print station 26 for printing on side A. Card (4) is advanced into the surface treatment station 32 so that side B can be treated prior to printing. Card (10) is advanced into the mechanism 16 into the position formerly occupied by card (4) with side A facing upward. In addition, card (11) is advanced into the position formerly occupied by card (10) and card (12) is advanced into the position formerly occupied by card (11).

Once a card reaches the mechanism 36, if no further printing is required on the card, the card can be advanced through the mechanism 36 and out of the mechanism 16. At the same time, if a card is advanced out of the mechanism 16, a new card can be transported into the mechanism 16 via the mechanism 40 to begin the process of printing on a surface of the new card. After a surface of the new card is printed, it can be recirculated back upstream of the print station 26 along the return card travel path 28 and flipped so that the other side of the new card faces upward, so that printing can occur on the other side of the new card.

If printing on both sides A and B of the card is not required, the card can be passed a single time through the print station 26 and then output from the mechanism 16 without recirculating the card through the return card travel path 28.

A method of processing cards in the card processing system 10 that results from the example system 10 and the example sequencing illustrated in FIGS. 2-4 includes printing on a first side (such as side A) of a first card, for example card 8, using the print station 26. See FIG. 2. Thereafter, a second side (such as side B) of a second card, for example card 3, is printed on using the print station 26. See FIG. 3. The second card, for example card 3, includes printing on a first side (such as side A) thereof that was previously applied to the first side thereof using the print station 26. In other words, the second card, for example card 3, was previously transported through the print station 26 which printed on side A, with the second card, for example card 3, ultimately being recirculated back upstream of the print station and ultimately fed back through the print station 26 to print on side B as illustrated in FIG. 3. In addition, after printing on the second side of the second card, for example card 3, the second side (such as side B) of the first card, for example card 8, is printed on in the print station 26 as a result of the first card, such as card 8, ultimately being recirculated back upstream of the print station 26 and ultimately fed back through the print station 26 to print on side B using whichever card sequencing is being implemented.

As is apparent from FIGS. 2-4, after printing on the first side of the first card, for example card 8, the side A or the side B of at least one additional card is printed on before printing occurs on the second side of the first card, for example card 8. The printing on the additional card(s) occurs as the first card, for example card 8, is being recirculated back for printing on the second side thereof in the print station 26. One additional card, two additional cards, three additional cards, four additional cards, five additional cards, or more than five additional cards, can be printed on as the first card, for example card 8, is being recirculated back for printing on the second side thereof.

With drop-on-demand printing, it is preferable that the card being printed on in the print station 26 is oriented such that the card is oriented substantially flat or horizontal relative to the ground. However, in some card processing systems, cards may be transported along the card processing path 22 in a second orientation where the cards are oriented substantially vertically relative to the ground. Therefore, in such an embodiment, upon reaching the mechanism 16, the cards need to be reoriented by rotating the cards 90 degrees, for example from a vertical orientation to a horizontal orientation, and upon exiting the mechanism 16, the cards may need to be reoriented by rotating the cards 90 degrees, for example from the horizontal orientation back to the vertical orientation.

Figure 5:
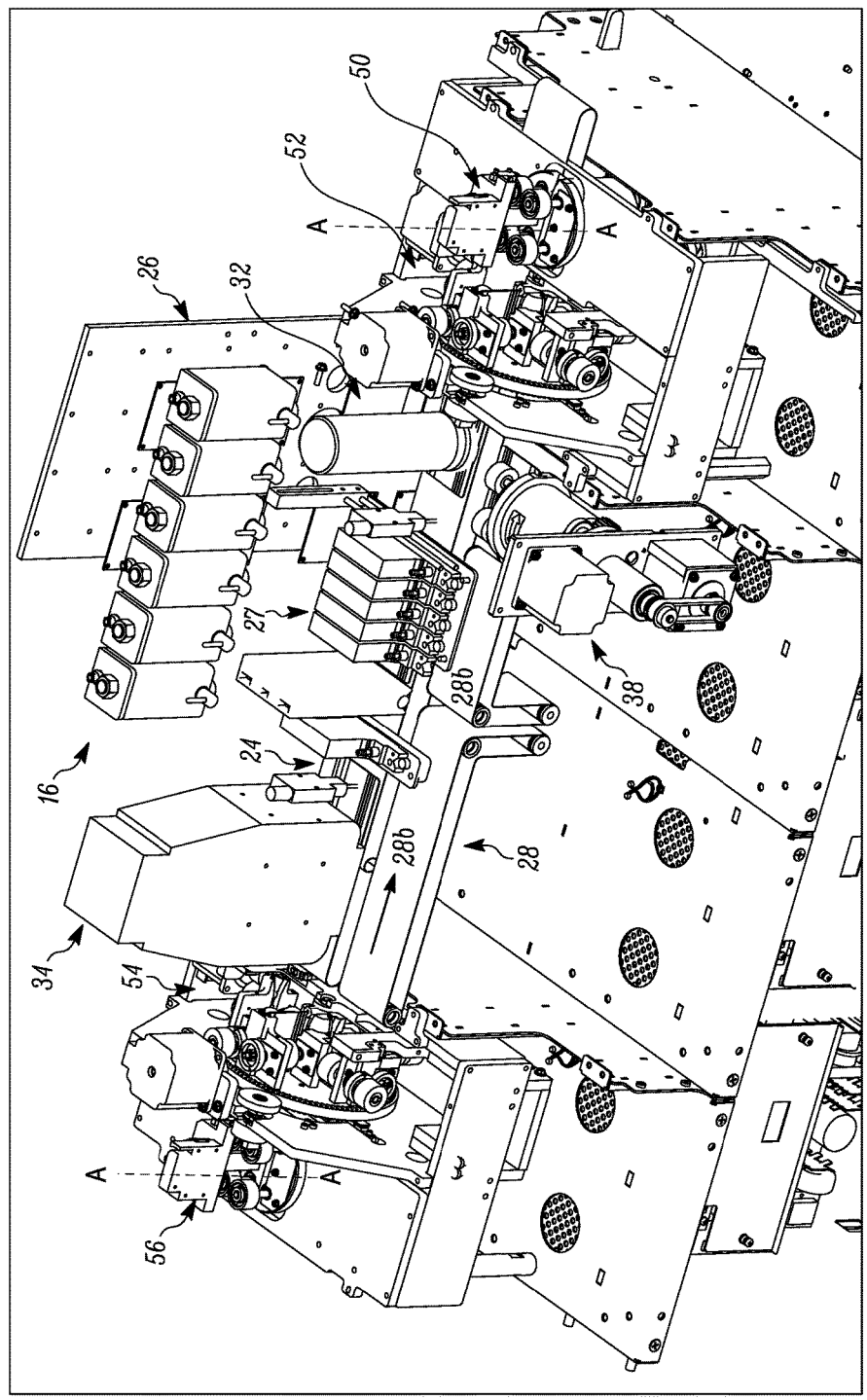
FIG. 5 is a perspective view of a portion of an example card printing mechanism showing mechanisms for rotating the cards from one orientation to another.

FIG. 5 shows a portion of an embodiment of the mechanism 16 that is configured to reorient the cards 90 degrees at both the entrance and the exit of the mechanism 16. In this example, cards enter the mechanism 16 in a vertical orientation. The mechanism 16 in FIG. 5 also has the primary card travel path 24 and the portion 28b of the return card travel path 28 is located next to and in the same plane as the primary card travel path 24.

The cards can initially enter the mechanism 16 into an optional input roller mechanism 50. The mechanism 50 can rotate about a vertical axis A-A. The mechanism 50 is useful for, if necessary, flipping the cards about the axis A-A so that if side A of a card is facing forward upon entry into the mechanism 16, the mechanism 50 can rotate the card so that side B faces forward. If flipping of a card is not required, the card can simply pass through the mechanism 50 without being flipped about the axis A-A.

Each vertically oriented card is then fed into a first rotation mechanism 52. The rotation mechanism 52 is configured to receive each card, and then rotate in either direction about an axis that is substantially parallel to the primary card travel path 24 to rotate the card from its vertical orientation to a horizontal orientation that is aligned with the primary card travel path 24. The now horizontal card can then be transported from the mechanism 52 and onto the primary card travel path 24. The mechanism 52 can rotate 90 degrees in either direction to bring the now horizontal card into alignment with the primary card travel path 24. The mechanism 52 is also configured to receive a card from the portion 28b of the return card travel path 28 and rotate 180 degrees along with the card about the axis that is substantially parallel to the primary card travel path 24 to bring the card back to the primary card travel path 24.

The now horizontal card is then transported past the print head(s) 27 of the print station 26 for printing on whichever surface is facing upwardly toward the print head(s) 27. Once printing is complete, the card is fed into the UV curing station 34. After curing, the card is fed into a second rotation mechanism 54 near the output of the mechanism 16. The rotation mechanism 54 is configured to receive each card, and then rotate in either direction about an axis that is substantially parallel to the primary card travel path 24 to transport the horizontally oriented card from the primary card travel path 24 to the portion 28b of the return card travel path 28. In one embodiment, the rotation mechanism 54 rotates 180 degrees to transport the card from the primary card travel path 24 to the portion 28b of the return card travel path 28 with the card still in its horizontal orientation. The card can then be transported along the portion 28b of the card travel path 28 to the flipper 38 which can flip the card (if necessary) so that the appropriate side faces upward. The card is then transported into the first rotation mechanism 52 which rotates to transport the can back to the primary card travel path 24.

An optional output roller mechanism 56 can be provided adjacent to the output of the mechanism 16. The mechanism 56 is similar in construction and operation to the mechanism 50 in that the mechanism 56 can rotate about a vertical axis A-A. The mechanism 56 is useful for, if necessary, flipping the cards about the axis A-A so that if side A of a card is facing forward as it is about the exit the mechanism 16, the mechanism 56 can rotate the card so that side B faces forward. If flipping of a card is not required, the card can simply pass through the mechanism 56 without being flipped about the axis A-A.

The techniques described herein can be used with printing other than drop-on-demand printing. For example, in the case of thermal dye diffusion printing, if printing is required on both sides A and B of the card, the card can be recirculated back to the thermal dye diffusion printhead. In the case of thermal dye diffusion printing, the stations 32, 34 in FIGS. 2-4 would not be required, and reorienting the cards from vertical to horizontal and from horizontal back to vertical would not be required thereby eliminating the need for the rotation mechanisms 52, 54.

The cards can be transported along the primary card travel path 24 and the portion 28b of the return card travel path 28, as well as along the card processing path 22 through the mechanisms 14, 18 using any card transport mechanisms that are well understood by people of ordinary skill in the art. For example, the cards can be transported using rollers, belts, and combinations thereof.

The mechanisms 12, 14 and 18 have been described as having card rates approximately equal to one another (for example each up to about 300 cards per hour), and the mechanism 16 has been described as having a card rate (for example up to about 6000 cards per hour or even greater) that is greater than the card rates of the mechanisms 12, 14, 18. However, the mechanisms 12, 14, 16 and 18 can have card rates that are approximately equal to one another.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:
1. A card printing mechanism comprising:
 a card input end having a card input through which plastic cards can be input into the card printing mechanism;
 a primary card travel path extending from the card input along which the plastic cards can travel in a first direction after being input through the card input;
 a print station on the primary card travel path downstream from the card input that performs a printing operation on surfaces of the plastic cards on the primary card travel path, the print station includes at least one print head;

a return card travel path, separate from the primary card travel path, along which the plastic cards can travel to be returned back to the primary card travel path at a position upstream of the print station, the return card travel path includes a portion that is substantially parallel to a portion of the primary card travel path having the print station, and the plastic cards travel in a second direction opposite the first direction when on the portion that is substantially parallel to the portion of the primary card travel path having the print station;

a card output end having a card output through which plastic cards can be output from the card printing mechanism; and the portion of the return card travel path that is substantially parallel to the portion of the primary card travel path having the print station is located on a same plane as the portion of the primary card travel path having the print station.

2. The card printing mechanism of claim 1, wherein the print station comprises a drop-on-demand print station and the at least one print head prints using UV curable ink; and further comprising a UV curing station located on the primary card travel path downstream of the drop-on-demand print station.

3. The card printing mechanism of claim 1, further comprising a card surface treatment station on the primary card travel path between the print station and the card input.

4. The card printing mechanism of claim 1, further comprising a card flipper that is configured to flip a plastic card after the plastic card has been printed in the print station.

5. The card printing mechanism of claim 1, where the print station comprises a plurality of print heads.

6. The card printing mechanism of claim 1, wherein the card printing mechanism is configured so that a first plastic card, a second plastic card, and a third plastic card are located in sequential order on the primary card travel path; each of the first plastic card, the second plastic card and the third plastic cards has a first side and a second side opposite the first side; the first plastic card and the third plastic card are oriented with the first sides thereof facing upward, and the second plastic card is positioned between the first plastic card and the third plastic card and the second plastic card is oriented with the second side thereof facing upward.

7. A card printing mechanism comprising:
a card input through which plastic cards can be input into the card printing mechanism;
a primary card travel path extending from the card input along which the plastic cards can travel in a first direction after being input through the card input;
a print station on the primary card travel path downstream from the card input that performs a printing operation on surfaces of the plastic cards on the primary card travel path, the print station includes at least one print head;
a return card travel path, separate from the primary card travel path, along which the plastic cards can travel to be returned back to the primary card travel path at a position upstream of the print station after being printed on in the print station;
a card output through which plastic cards can be output from the card printing mechanism;
wherein the card printing mechanism is configured such that the plastic cards on the primary card travel path are arranged in an alternating sequence where a first one of the plastic cards has a first orientation with a first surface thereof facing upward and a second surface thereof facing downward and a second one of the plastic cards in sequence following the first plastic card has a second orientation with the first surface thereof facing downward and the second surface thereof facing upward.

8. The card printing mechanism of claim 7, wherein the print station comprises a drop-on-demand print station and the at least one print head prints using UV curable ink; and further comprising a UV curing station located on the primary card travel path downstream of the drop-on-demand print station.

9. The card printing mechanism of claim 7, further comprising a card surface treatment station on the primary card travel path between the print station and the card input.

10. The card printing mechanism of claim 7, wherein the return card travel path includes a portion that is substantially parallel to the primary card travel path, and the portion of the return card travel path is located on a same plane as the primary card travel path.

11. The card printing mechanism of claim 7, further comprising a card flipper that is configured to flip a plastic card after the plastic card has been printed in the print station.

12. The card printing mechanism of claim 7, where the print station comprises a plurality of print heads.

13. A card processing system, comprising:
a card feed mechanism, a card printing mechanism, and a card processing path extending from the card feed mechanism to the card printing mechanism;
the card printing mechanism includes:
a card input in communication with the card processing path and through which plastic cards from the card feed mechanism can be input into the card printing mechanism;
a primary card travel path extending from the card input along which the plastic cards can travel in a first direction after being input through the card input;
a print station on the primary card travel path downstream from the card input that performs a printing operation on surfaces of the plastic cards on the primary card travel path, the print station includes at least one print head;
a return card travel path, separate from the primary card travel path, along which the plastic cards can travel to be returned back to the primary card travel path at a position upstream of the print station after being printed on in the print station;
a card output through which plastic cards can be output from the card printing mechanism;
wherein the card processing system is configured such that each of the plastic cards fed from the card feed mechanism reach the card input in a first orientation with a first surface of each plastic card facing upward and a second surface of each plastic card facing downward; and the plastic cards on the primary card travel path are arranged in an alternating sequence where a first one of the plastic cards has the first orientation and a second one of the plastic cards in sequence following the first plastic card has a second orientation with the first surface thereof facing downward and the second surface thereof facing upward.

14. The card processing system of claim 13, wherein the print station comprises a drop-on-demand print station and the at least one print head prints using UV curable ink; and further comprising a UV curing station located on the primary card travel path downstream of the drop-on-demand print station.

15. The card processing system of claim 13, further comprising a card surface treatment station on the primary card travel path between the print station and the card input.

16. The card processing system of claim 13, wherein the return card travel path includes a portion that is substantially parallel to the primary card travel path and located on a same plane as the primary card travel path.

17. The card processing system of claim 13, further comprising a card flipper that is configured to flip a plastic card after the plastic card has been printed in the print station.

18. The card processing system of claim 13, further comprising a smart card programming mechanism disposed in the card processing path between the card feed mechanism and the card printing mechanism, the smart card programming mechanism is configured to program a chip embedded in each of the plastic cards fed from the card feed mechanism onto the card processing path.

\* \* \* \* \*